Oct. 17, 1967 O. M. HAWKINS ET AL 3,347,712

MEANS FOR DETERMINING THE TEMPERATURE OF THE SOLID PROPELLANT IN A TEST ROCKET MOTOR CASE

Filed May 19, 1964

Oscar M. Hawkins
Victor E. Heaton INVENTORS
John S. Epps

BY Robt Stellhamm Jr

ATTORNEY

United States Patent Office 3,347,712

Patented Oct. 17, 1967

3,347,712
MEANS FOR DETERMINING THE TEMPERATURE OF THE SOLID PROPELLANT IN A TEST ROCKET MOTOR CASE

Oscar M. Hawkins, Victor E. Heaton, and John S. Epps, Huntsville, Ala., assignors to Thiokol Chemical Corporation, Bristol, Pa., a corporation of Delaware Filed May 19, 1964, Ser. No. 368,624
1 Claim. (Cl. 136—230)

ABSTRACT OF THE DISCLOSURE

An expendable thermocouple that is insertable into a motor case containing a solid propellant that, when connected to a recording apparatus, will indicate the temperature of the solid propellant under all the temperature ranges to which the motor case is subjected.

Figures 1, 2:
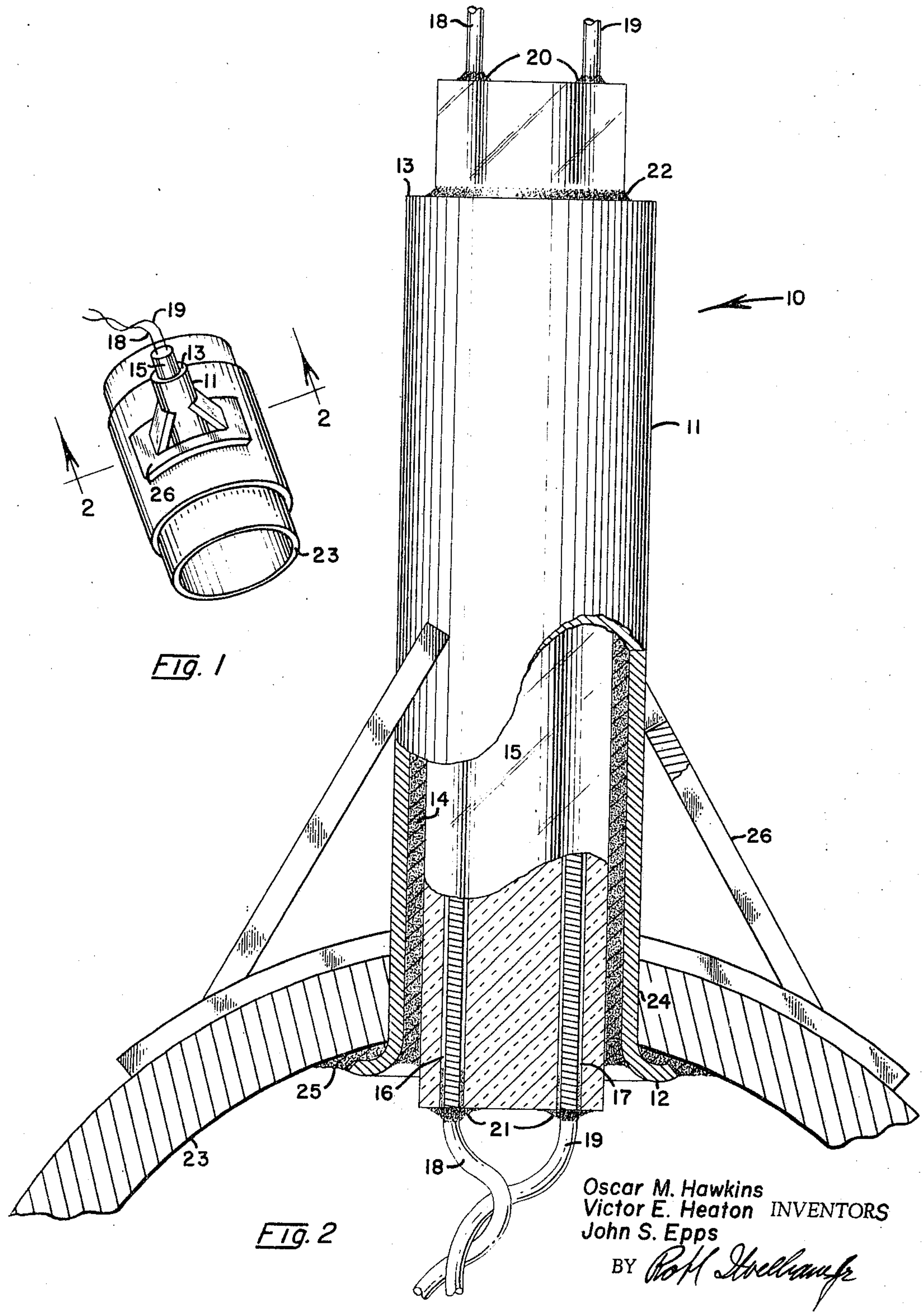

This invention relates to means for determining the temperature of the solid propellant in a test rocket motor and, more particularly, to an expendable thermocouple that, when connected to a recording apparatus, will indicate the temperature of the solid propellant under all the temperature ranges to which the test rocket motor is subjected.

The largest single factor causing variation of ignition characteristics in a rocket motor is the temperature of the solid propellant in the rocket motor. At high temperatures, propellants have higher burning rates and are easier to ignite; whereas, at low temperatures, the opposite situation exists.

To determine the ignition characteristics of different mixes of solid propellant, a small test motor in which the solid propellant has been cast is test fired. The small test motor is subjected to wide temperature ranges; and it is important to ascertain the temperature of the solid propellant at the time the test is made so that its ability to operare under certain temperature conditions can be determined.

The use of a thermocouple is apparently the best method that can be used during such a test. However, since the thermocouple is usually destroyed during the test, it is of paramount importance that the initial cost of the thermocouple be maintained at the lowest possible level. Since the motor case is not destroyed during the test and is reuseable for many such tests, it was also important to provide a thermocouple that could easily be connected to the motor case.

The thermocouple also had to be fabricated so that there was no possibility of the gases generated during the test firing escaping from the motor case.

The trajectory or trace pattern of a solid propellant rocket motor is also affected by the temperature of the solid propellant; and should the recordings taken during the test be affected by the reduction of pressure occasioned by the escape of generated gases through the thermocouple, a true reading of the characteristics of the solid propellant would not be available.

It is an object of the invention, therefore, to provide an expendable thermocouple that is to be used with test motor cases to determine the temperature of the solid propellant that has been cast in the test motor case.

It is another object of the invention to provide an expendable thermocouple that is simple in construction, inexpensive to manufacture and can be quickly connected to a test motor case.

A still further object of the invention is to provide a thermocouple that is durable and leak-proof in operation, since it will have to withstand the high pressure that is created during the firing of a solid propellant test motor.

With the above and other objects and advantages in view, the invention consists of the novel details of construction, arrangement and combination of parts more fully hereinafter described, claimed and illustrated in the accompanying drawing in which:

FIGURE 1 is a perspective view showing the thermocouple embodying the invention connected to a test motor case, and FIGURE 2 is an enlarged elevational view of a thermocouple embodying the invention, partially in section, along the line 2—2 of FIGURE 1.

Referring more in detail to the drawing wherein like parts are designated by like reference numerals, the reference numeral 10 is used to generally designate an expendable thermocouple embodying the present invention.

The thermocouple 10 comprises an outer metal tube 11 which may be of copper or any other suitable metal. The tube 11 has one end thereof flared outwardly to provide an annular flange 12, while the opposite end 13 is produced by a straight cut transversely of the tube 11.

Positioned within the tube 11 and bonded to the interior thereof by an epoxy resin 14 is a glass rod 15. The glass rod 15 has a pair of spaced, parallel bores 16 and 17 extending longitudinally thereof in which are positioned a pair of conductor wires 18 and 19 respectively, one in each of the bores 16 and 17. The bores 16 and 17 at one end where the wires 18 and 19 extend outwardly of that end of the glass rod 15 are sealed by an epoxy resin 20.

The opposite ends of the bores 16 and 17 being sealed by an epoxy resin 21 where the wires 18 and 19 extend from that end of the rod 15. At the joint of the end 13 of the tube 11 with the rod 15, an epoxy resin 22 is also used to seal this joint. All clearances and joints between the tube 11, rod 15 and wires 18 and 19 are sealed by an epoxy resin to prevent any leakage of generated gases through such clearances and joints.

A test motor case 23 is used that is provided with an aperture 24 through which the thermocouple 10 is inserted from the inside of the test motor case 23. The size of the test motor case 23 may be varied as the necessity arises; but it is usually constructed of the same material as the master motor case that will be used in the fabrication of the final solid propellant rocket motor.

After the thermocouple 10 is in place, a sealant 25, such as epoxy resin, is placed between and around the flange 12 of the tube 11 to prevent the leakage of generated gases past this end of the tube 11.

A spring clip 26 of conventional structure is then placed in position on the thermocouple 10 to retain the thermocouple 10 in fixed relation to the test motor case 23.

The thermocouple 10 operates in the usual way, the inner ends of the wires 18 and 19 being embedded in the solid propellant when it is cast into the test motor case 23 and the outer ends of the wires 18 and 19 being connected to a conventional recording instrument, not shown. The temperature of the solid propellant surrounding the sensing ends of the wires 18 and 19 will be properly recorded to determine the temperature of the solid propellant at the time the test is being conducted.

The clip 26 provides a quick attachable means for retaining the thermocouple in place; and thus is a time saver as compared to other means that have been used for the same purpose.

The installation of the thermocouple 10 is simple, the test motor case 23 is of a size that the thermocouple 10 can be inserted through the opening 24 therein. The epoxy resin 25 is placed on the flange 12 of the tube 11. The thermocouple 10 is inserted through the opening 24, as shown in FIGURE 2; and the clip 26 is placed on the thermocouple 10 and moved into retaining position. After connecting the leads 18 and 19 to a recording instrument, the thermocouple 10 is then ready for operation as soon as the epoxy resin 25 has properly cured.

There has thus been provided an expendable thermocouple that is to be used to indicate the temperature of the solid propellant in a solid propellant rocket motor; and it is believed that the operation and construction of the invention will be clear to those skilled in the art from the foregoing description. It is also to be understood that variations in the mode of operation and construction of the thermocouple may be adhered to providing such variations fall within the spirit of the invention and the scope of the appended claim.

Having thus described the invention, what is claimed as new and desired to be secured by Letters Patent is:

An expendable thermocouple for use in indicating the temperature of the solid propellant in a motor case having a mounting opening therein, comprising a tubular metal body having an annular flange at one end thereof and a straight transversely extending cut at the opposite end, a glass rod having longitudinally extending, spaced parallel bores therein, conductor wires positioned in said bores and extending outwardly of the end of said glass rod and the end of said tubular metal body having the flange thereon to be embedded in the solid propellant, an epoxy resin for sealing the conductor wires in the bores and the glass rod in the metal body, an epoxy resin for bonding the flange to the motor after the tubular body has been inserted through the mounting opening in said motor case so that said annular flange engages the inner surface of the motor case and the end having the straight transversely extending cut thereon extends outwardly of the motor case, and a quick detachable spring clip engaging said metal body outwardly of said motor case for retaining said metal body in fixed relation to said motor case.

References Cited

UNITED STATES PATENTS

| | | | |
|---|---|---|---|
| 1,660,504 | 2/1928 | Grubb | 136—233 |
| 2,752,411 | 6/1956 | Walter | 136—221 X |

FOREIGN PATENTS

| | | |
|---|---|---|
| 752,277 | 7/1956 | Great Britain. |

ALLEN B. CURTIS, *Primary Examiner.*